Feb. 3, 1953
H. KRAGNESS
2,627,117
MEASURING TAPE
Filed Sept. 26, 1951
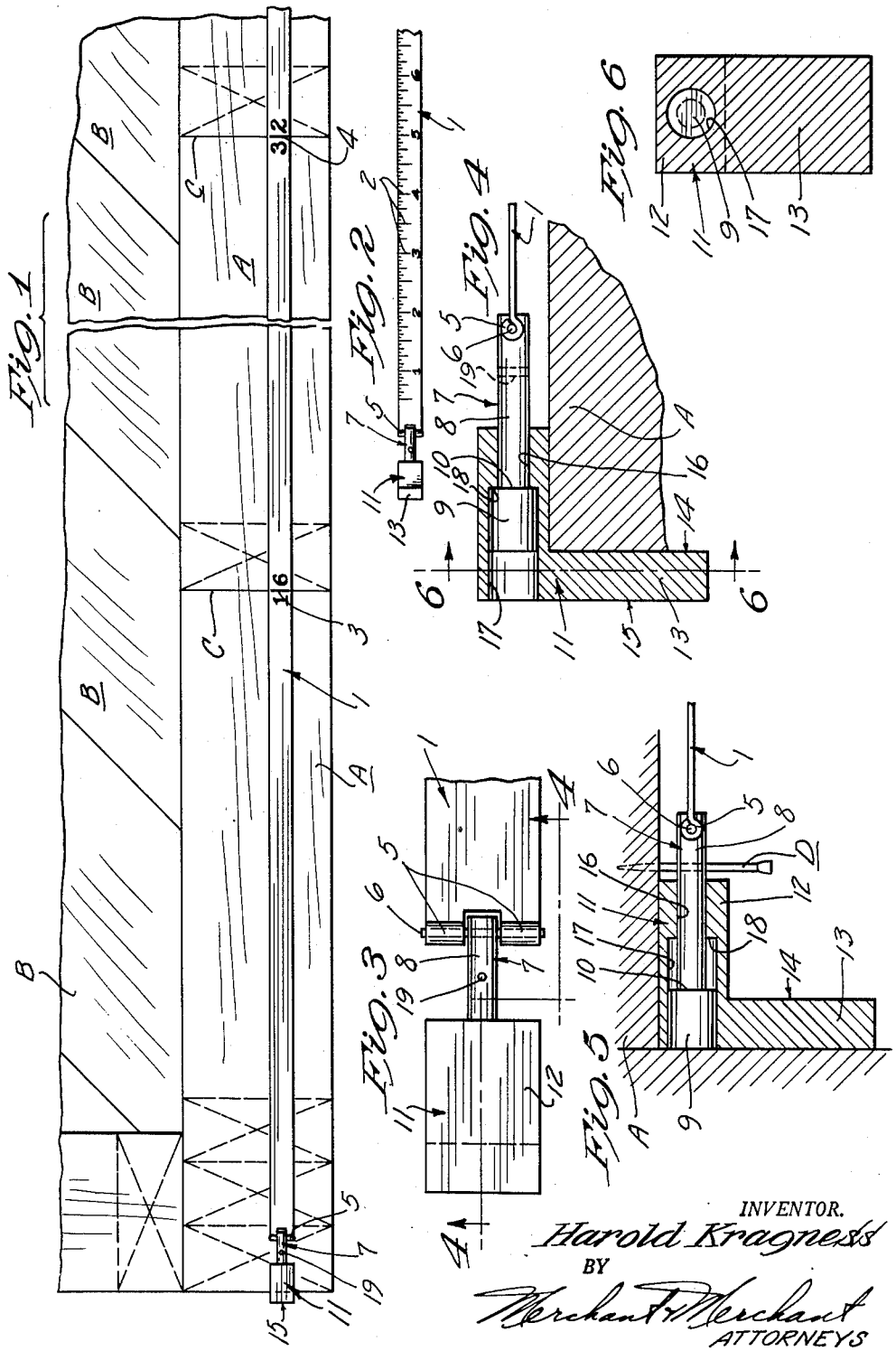
INVENTOR.
Harold Kragness
BY
Merchant & Merchant
ATTORNEYS Patented Feb. 3, 1953

2,627,117

UNITED STATES PATENT OFFICE 2,627,117

MEASURING TAPE

Harold Kragness, Canby, Minn.

Application September 26, 1951, Serial No. 248,429

3 Claims. (Cl. 33—137)

My invention relates generally to measuring devices and more specifically to improvements in so-called "tape measure" devices.

An important object of my invention is the provision of a flexible measuring tape having markings on one surface thereof which will enable a carpenter or other workman to locate studdings for a frame type building without the necessity of moving the measuring device for each measurement or adding each distance between the studding locations arithmetically.

Another highly important object of my invention is the provision of a measuring tape of the above type which is adapted to be used with equal facility to measure from either inside or outside corners.

Another object of my invention is the provision of novel means whereby one end of the measuring tape may be anchored against accidental movement with respect to the work or structure being measured.

Still another object of my invention is the provision of a measuring tape, as set forth, which is simple and inexpensive to manufacture and which is rugged in construction and durable in use.

Other highly important objects and advantages of my invention will become apparent from the following detailed specification, appended claims, and attached drawings.

Referring to the drawings which illustrate the invention and in which like characters indicate like parts throughout the several views:

Fig. 1 is a fragmentary top plan view of the subfloor of a building of the frame type illustrating the operation of my novel measuring tape;

Fig. 2 is a fragmentary bottom plan of my improved measuring tape;

Fig. 3 is an enlarged fragmentary top plan of the free end of my novel measuring tape and anchoring means therefor;

Fig. 4 is a view partly in section and partly in side elevation taken substantially on the line 4—4 of Fig. 3, illustrating the method of anchoring the free end of my measuring tape to an outside corner;

Fig. 5 is a view corresponding to Fig. 4, but illustrating the free end anchored to an inside corner; and Fig. 6 is a transverse section taken on the line 6—6 of Fig. 4.

Referring with greater detail to the drawings, the numeral 1 indicates, in its entirety, a measuring tape having conventional markings 2 on one side thereof and other markings 3 and 4 on the opposite side thereof. The markings 2 designate one inch graduations together with fractional parts thereof, while the markings 3 and 4 are spaced apart a distance equal to the normal spacing of studdings in a frame type building such as a dwelling or the like. These distances are normally 16 inches apart. The tape 1 may be of any suitable length, one end, not shown, being contained in a casing also not shown but in which substantially the entire length of tape may be rolled for storage or the like. The casing may be one of any of a number of types in common usage. The tape 1 may be made from any suitable material such as non-stretching fabric, metal, or otherwise. The markings 2, 3, and 4 may be imprinted upon or etched in the material of the tape depending upon the nature of the material from which the tape is made.

In the preferred embodiment illustrated, the tape 1 is made from suitable metal such as relatively thin steel ribbon the free end thereof being bifurcated and formed to provide hinge loops 5 through which extends a pintle pin 6. A slide element 7 comprises a shank 8 and a diametrically enlarged head 9 which cooperate to define an annular shoulder 10 the purpose of which will hereinafter become apparent. The outer end of the shank 8 is received between the hinge loops 5 of the tape 1 and is provided with a transverse opening through which the pintle 6 extends, permitting relative swinging movements between the slide element 7 and tape 1.

Cooperating with the slide element 7 is a hook element 11 comprising a body portion 12 and a laterally projecting hook-forming portion 13 having opposed work-engaging faces 14 and 15. The body portion 12 of the hook element 11 is bored to provide an aperture 16 of a diameter to slidably receive the shank 8 and counterbored to provide a larger diameter aperture 17 axially aligned with the aperture 16 and of a diameter capable of slidably receiving the enlarged head 9 of the slide element 7. The apertures 16 and 17 cooperate to define an internal annular shoulder 18 which provides an abutment for the shoulder 10 on the slide element 7 to limit sliding movements of the slide element 7 in one direction. Intermediate the hinge pintle 6 and the adjacent end of the hook element 11 the shank 8 of the slide element 7 is provided with an aperture 19 which extends diametrically therethrough.

With particular reference to Fig. 4, it will be seen that the work-engaging surface 14 of the hook element 11 is parallel to the plane of the internal shoulder 18 and that the distance between the work-engaging surface 14 of the plane of the internal shoulder 18 is equal to the length of the enlarged head 9 of the slide element 7. With this arrangement, the distance from a corner of the work to be measured to the first marking 3 will be the same whether the measurement is made from an outside corner, as in Fig. 4, or an inside corner, as in Fig. 5. It should be noted that when measurement is taken from an inside corner, as in Fig. 5, that the slide element 7 is moved with respect to the hook element 11 so that the outer end of the enlarged head 9 is flush with the surface 15 of the hook element 11, the amount of sliding movement being equal to the thickness of the laterally projected portion 13 between the surfaces 14 and 15 thereof.

In use, my measuring tape is laid across the unfinished floor of a frame building, preferably on the sole plate or board A to which the studdings are to be secured, with the hook element 11 engaging one end thereof, see Fig. 1. The character B indicates the conventional subflooring of a frame type building such as a conventional dwelling or the like. With the measuring tape 1 extended along the sole plate A, the workman marks the sole plate with a line C at each marking 3 and 4 on the tape 1. Each line C serves as a guide for one side of a studding to be nailed or otherwise rigidly secured to the sole plate A. This arrangement provides for rapid and accurate locating of studs about the entire frame of the building.

In the event that measurement must be made from an inside corner, as illustrated in Fig. 5, the slide element 7 may be anchored in place by merely inserting a nail D through the transverse aperture 19 in the shank 8 and driving the nail D into the sole plate A or other structure to be measured. The measuring tape 1 may then be extended over the length to be measured without danger of accidental slippage or the like. It should be noted that the hook element 11 in addition to being slidable with respect to the slide element 7 is also rotatable with respect thereto so that the hook portion 13 is adapted to extend in any direction radially of the shank 8. Thus, the measuring tape 1 may be turned with respect to the hook element 11 so that either side of the tape may be read without disturbing the position of the hook element 11 with respect to the work, except, of course, when the shank is secured to the work by the nail D.

My invention has been thoroughly tested and found to be completely satisfactory for the accomplishment of the objectives set forth; and, while I have shown and described a preferred embodiment of my novel measuring tape, it will be understood that the same is capable of modification without departure from the spirit and scope of the invention, as defined in the claims.

What I claim is:

1. In a device of the class described, an elongated flexible measuring tape having markings on one side thereof at intervals to indicate the normal spacing of studdings in a frame type building structure, a slide element comprising a shank having an enlarged head portion at one end, said shank and head defining a shoulder, hinge means mounting the free end of the shank to one end of said tape for relative swinging movements with respect thereto, and a hook element having an aperture extending therethrough and defining an internal shoulder, said aperture being of a size at one side of said shoulder to slidably receive said shank and at the other side thereof to slidably receive said enlarged head, the shoulder on said slide element being engageable with said internal shoulder to limit relative sliding movements of the hook and slide elements in one direction, said hook element including a laterally projected portion having a work-engaging surface parallel to the plane of said internal shoulder and spaced from said plane a distance equal to the length of the head of said slide element.

2. The structure defined in claim 1 in which the opposite side of said tape is provided with markings designating single inches and fractions thereof, and in which said slide element is provided with an aperture extending transversely through the shank thereof intermediate said hook element and said hinge means.

3. The structure defined in claim 1 in which the shank and enlarged head portions of said slide element and the apertures in said hook element for the reception of said shank and head portion are circular in cross-section whereby to permit relative rotary movements between said slide element and said hook element.

HAROLD KRAGNESS.

REFERENCES CITED

The following references are of record in the file of this patent:

UNITED STATES PATENTS

| Number | Name | Date |
|---|---|---|
| 1,102,436 | Richardson | July 7, 1914 |
| 1,631,682 | Hoffstetter | June 7, 1927 |
| 2,187,087 | Leary | Jan. 16, 1940 |